United States Patent
Dunlap et al.

(10) Patent No.: US 11,794,848 B2
(45) Date of Patent: Oct. 24, 2023

(54) HYDRAULIC BRAKE CONTROL DEVICE WITH HANDLEBAR PROXIMAL HOSE ATTACHMENT

(71) Applicant: SRAM, LLC, Chicago, IL (US)

(72) Inventors: Charles Dunlap, Manitou Springs, CO (US); Brian Jordan, Highland Park, IL (US); Braden Snead, Colorado Springs, CO (US)

(73) Assignee: SRAM, LLC

( * ) Notice: Subject to any disclaimer, the term of this patent is extended or adjusted under 35 U.S.C. 154(b) by 0 days.

(21) Appl. No.: 17/548,063

(22) Filed: Dec. 10, 2021

(65) Prior Publication Data
US 2022/0185426 A1    Jun. 16, 2022

Related U.S. Application Data

(63) Continuation-in-part of application No. 17/121,310, filed on Dec. 14, 2020.

(51) Int. Cl.
*B62L 3/02* (2006.01)
*B62K 23/06* (2006.01)

(52) U.S. Cl.
CPC .............. *B62L 3/023* (2013.01); *B62K 23/06* (2013.01)

(58) Field of Classification Search
CPC ......... B62L 3/023; B62K 23/06; B60T 11/22; B60T 7/102; F15B 15/1414
See application file for complete search history.

(56) References Cited

U.S. PATENT DOCUMENTS

| | | | |
|---|---|---|---|
| 5,464,239 | A | 11/1995 | Gajek |
| 6,336,525 | B1 | 1/2002 | Leng |
| 6,484,855 | B1 | 11/2002 | Yaple |
| 6,983,949 | B2 | 1/2006 | Ueno et al. |
| 7,000,936 | B2 | 2/2006 | Schmider |
| 7,891,687 | B2 | 2/2011 | Schmider |
| 9,056,646 | B1 | 6/2015 | D'Aluisio et al. |
| 9,096,287 | B2 | 8/2015 | Shadwell |
| 9,174,695 | B1 | 11/2015 | Wang |

(Continued)

FOREIGN PATENT DOCUMENTS

| | | |
|---|---|---|
| CN | 101468705 | 7/2009 |
| CN | 201999156 U | 10/2011 |

(Continued)

OTHER PUBLICATIONS

"Preview: 2008 Formula One Disc Brakes", Web Page, Jan. 30, 2008, https://www.sicklines.com/2008/01/30/2008-formula-one-disc-brakes, last checked May 22, 2023.

(Continued)

*Primary Examiner* — Vinh Luong

(57) ABSTRACT

A control device for a hydraulic brake for a bicycle includes a reservoir for hydraulic fluid. The reservoir has a variable volume. The control device also includes a reservoir cover at least partially defining the reservoir, and a support that is attachable to a handlebar of the bicycle via an inner annular surface of the support. A handlebar proximity zone is radially outer relative to the inner annular surface of the support and is within two centimeters of the inner annular surface of the support. At least part of the reservoir cover is within the handlebar proximity zone.

9 Claims, 14 Drawing Sheets

(56) References Cited

U.S. PATENT DOCUMENTS

| | | | |
|---|---|---|---|
| 9,446,812 B2 | 9/2016 | Nago | |
| 10,086,813 B2 | 10/2018 | Bradley et al. | |
| 2005/0056508 A1* | 3/2005 | Laghi | B62L 3/023 188/344 |
| 2005/0199450 A1* | 9/2005 | Campbell | B60T 11/22 188/24.15 |
| 2011/0135521 A1* | 6/2011 | Vezzoli | B60T 7/102 417/429 |
| 2013/0294865 A1* | 11/2013 | Yamashita | F16D 55/228 411/418 |
| 2015/0321725 A1 | 11/2015 | Kariyama et al. | |
| 2016/0327067 A1 | 11/2016 | Fujiwara et al. | |
| 2019/0009858 A1 | 1/2019 | Hujer | |
| 2021/0316815 A1* | 10/2021 | Konrad | B60T 11/22 |
| 2021/0362801 A1* | 11/2021 | Obuchi | B62L 3/023 |
| 2021/0364016 A1* | 11/2021 | Nishikawa | B60T 11/22 |
| 2022/0185426 A1 | 6/2022 | Dunlap et al. | |

FOREIGN PATENT DOCUMENTS

| | | |
|---|---|---|
| CN | 104760652 | 7/2015 |
| CN | 108082382 | 5/2018 |
| EP | 1787899 | 3/2011 |
| EP | 3172120 | 5/2017 |
| GB | 2494714 | 3/2013 |
| NL | 2016166 | 8/2017 |
| WO | 0228701 | 4/2002 |
| WO | 2015/180756 | 5/2014 |

OTHER PUBLICATIONS

Benedict, Tyler, "EB16: Trickstuff Piccola's tiny size makes it the lightest hydraulic MTB brake ever, more", https://bikerumor.com/eb16-trickstuff-piccolas-tiny-size-makes-lightest-hydraulic-mtb-brake-ever/, last checked May 22, 2023.

Cunningham, Richard, "Trickstuff Cleg 4 Disc Brake—Review", https://www.pinkbike.com/news/trickstuff-cleg-4-disc-brakes-review-2015.html, last checked May 22, 2023.

\* cited by examiner

HYDRAULIC BRAKE CONTROL DEVICE WITH HANDLEBAR PROXIMAL HOSE ATTACHMENT

RELATED APPLICATION

This patent arises from a continuation-in-part of U.S. patent application Ser. No. 17/121,310, titled "Hydraulic Brake Control Device With Handlebar Proximal Hose Attachment", filed Dec. 14, 2020, which is hereby incorporated by this reference in its entirety.

BACKGROUND

Field of the Disclosure

The present disclosure is generally directed to a hydraulic brake control device for a hydraulic actuation system for a bicycle and, more particularly, to a hydraulic brake control device with handlebar proximal hose attachment.

Description of Related Art

Many vehicles, such as, for example, bicycles, utilize a hydraulic brake system that applies pressure to a rotating part, a rotating wheel, or a disc mounted to the rotating wheel. Some of these braking systems utilize a mechanism including a brake lever to generate pressure in a hydraulic fluid. This pressure is transferred through a hydraulic line or conduit to a brake assembly, such that the hydraulic pressure is applied to pads of the brake assembly to squeeze the pads against the rotating part to impart a braking force.

SUMMARY

In one example, a control device for a hydraulic brake for a bicycle includes a reservoir for hydraulic fluid. The reservoir has a variable volume. The control device also includes a reservoir cover at least partially defining the reservoir, and a support that is attachable to a handlebar of the bicycle via an inner annular surface of the support. A handlebar proximity zone is radially outer relative to the inner annular surface of the support and is within two centimeters of the inner annular surface of the support. The reservoir cover is within the handlebar proximity zone.

In one example, the reservoir cover is a diaphragm or a seal made of an elastomeric material.

In one example, the reservoir cover is a first reservoir cover. The control device further includes a second reservoir cover. The second reservoir cover defines an outer surface of the control device and covers the first reservoir cover and the reservoir. All of the second reservoir cover is within the handlebar proximity zone.

In one example, the control device further includes a cylinder having an interior defined by a cylinder wall. The cylinder extends along a cylinder axis. The interior of the cylinder is in communication with the reservoir. The control device also includes a piston positioned within the interior of the cylinder and movable within the cylinder and along the cylinder axis.

In one example, the control device further includes an outlet port in communication with the interior of the cylinder. The outlet port is connectable to a hydraulic brake line of the bicycle. The outlet port has an outlet port axis. The outlet port axis is a central axis extending through the outlet port. The inner annular surface defines a clamp surface axis. The clamp surface axis extends longitudinally along the inner annular surface.

In one example, the cylinder axis is at a positive acute angle relative to the clamp surface axis.

In one example, the control device further includes a bleed port in communication with the reservoir. The bleed port is closer to the clamp surface axis than the cylinder axis is relative to the clamp surface axis.

In one example, the bleed port is adjacent to the reservoir cover.

In one example, a brake control device for a bicycle includes a housing including a support that is attachable to a handlebar of the bicycle via an inner annular surface of the support. The inner annular surface defines a clamp surface axis and a clamp plane. The clamp surface axis extends longitudinally along the inner annular surface, and the clamp plane is perpendicular to the clamp surface axis and intersects the inner annular surface. The brake control device also includes a reservoir for hydraulic fluid. The reservoir is within the housing. The brake control device includes a cylinder having an interior defined by a cylinder wall. The cylinder extends along a cylinder axis. The interior of the cylinder is in communication with the reservoir. The brake control device also includes a piston positioned within the interior of the cylinder. The piston is movable within the cylinder and along the cylinder axis. The brake control device includes an actuator pivotably attached to the housing. The actuator is operatively connected to the piston within the interior of the cylinder. The brake control device also includes an outlet port in communication with the interior of the cylinder. The outlet port is connectable to a hydraulic brake line of the bicycle. The outlet port has an outlet port axis. The outlet port axis is a central axis extending through the outlet port. The reservoir and the actuator are on opposite sides of the clamp plane. The outlet port axis is different than the cylinder axis.

In one example, the outlet port axis is different than the cylinder axis in that the outlet port axis is offset relative to the cylinder axis, such that the outlet port axis is not coaxial with the cylinder axis.

In one example, the outlet port axis is different than the cylinder axis in that the outlet port axis is at a positive acute angle relative to the cylinder axis.

In one example, the outlet port axis is at a positive acute angle relative to the clamp surface axis.

In one example, the outlet port axis is parallel to the clamp surface axis.

In one example, the brake control device further includes a pivot. The actuator is pivotably attached to the housing via the pivot. The reservoir and the pivot are on opposite sides of the clamp plane.

In one example, a control device mountable to a handlebar of a bicycle includes a housing including a support that is attachable to the handlebar via an inner annular surface of the support. The inner annular surface defines a clamp surface axis. The clamp surface axis extends longitudinally along the inner annular surface of the support. The control device also includes a reservoir for hydraulic fluid. The reservoir is within the support. The control device includes a cylinder having an interior defined by a cylinder wall. The cylinder extending along a cylinder axis. The interior of the cylinder is in communication with the reservoir. The control device also includes a piston positioned within the interior of the cylinder. The piston is movable relative to the cylinder and along the cylinder axis. The control device includes an outlet port in communication with the interior of the cylinder. The outlet port is connectable to a hydraulic brake line of the bicycle. The outlet port has an outlet port axis. The outlet port axis is a central axis extending through the outlet port. The outlet port axis is at a first acute positive angle relative to the cylinder axis, the cylinder axis is at a second acute positive angle relative to the clamp surface axis, and the outlet port axis is at a third positive acute angle relative to the clamp surface axis. The first positive acute angle, the second positive acute angle, and the third positive acute angle are different angles.

In one example, the outlet port axis, the cylinder axis, and the clamp surface axis are coplanar.

In one example, the cylinder axis and the clamp surface axis define a cylinder plane. The outlet port axis is non-coplanar with the cylinder plane.

In one example, the control device further includes a bleed port in communication with the reservoir. The bleed port and the outlet port are on opposite sides of the cylinder plane.

In one example, the control device further includes an actuator that is operatively connected to the piston within the interior of the cylinder. The control device also includes a pivot. The actuator is pivotably attached to the support or the housing via the pivot and is pivotable relative to the support via the pivot about a pivot axis.

In one example, the inner annular surface further defines a clamp plane. The clamp plane is perpendicular to the clamp surface axis and intersects the inner annular surface. The reservoir and the pivot are on opposite sides of the clamp plane. The pivot axis is offset relative to the clamp surface axis by a distance of 30 mm or less.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
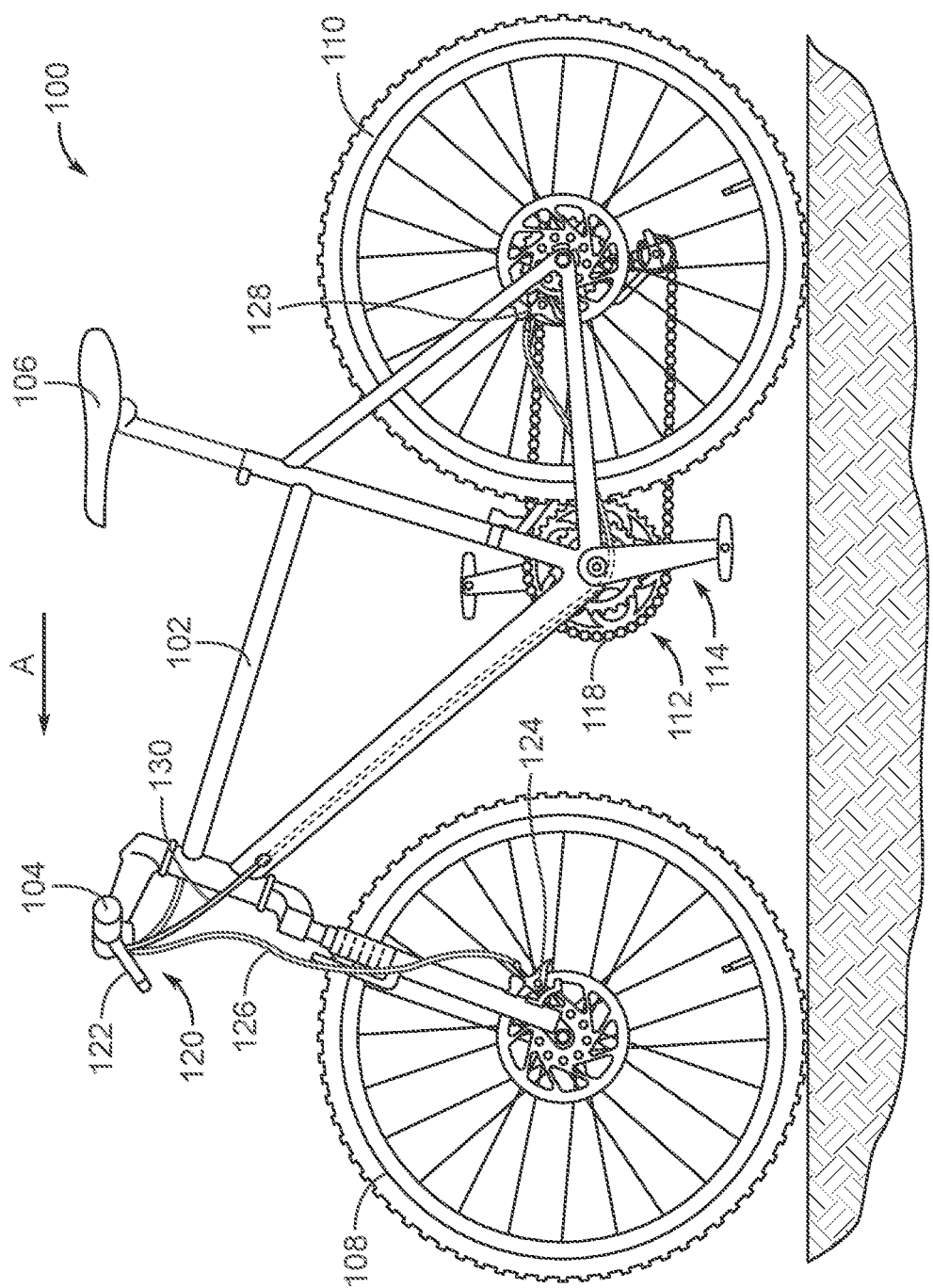
FIG. 1 is a side view of one example of a bicycle that may be fitted with a control device constructed in accordance with the teachings of this disclosure.
Figure 2:
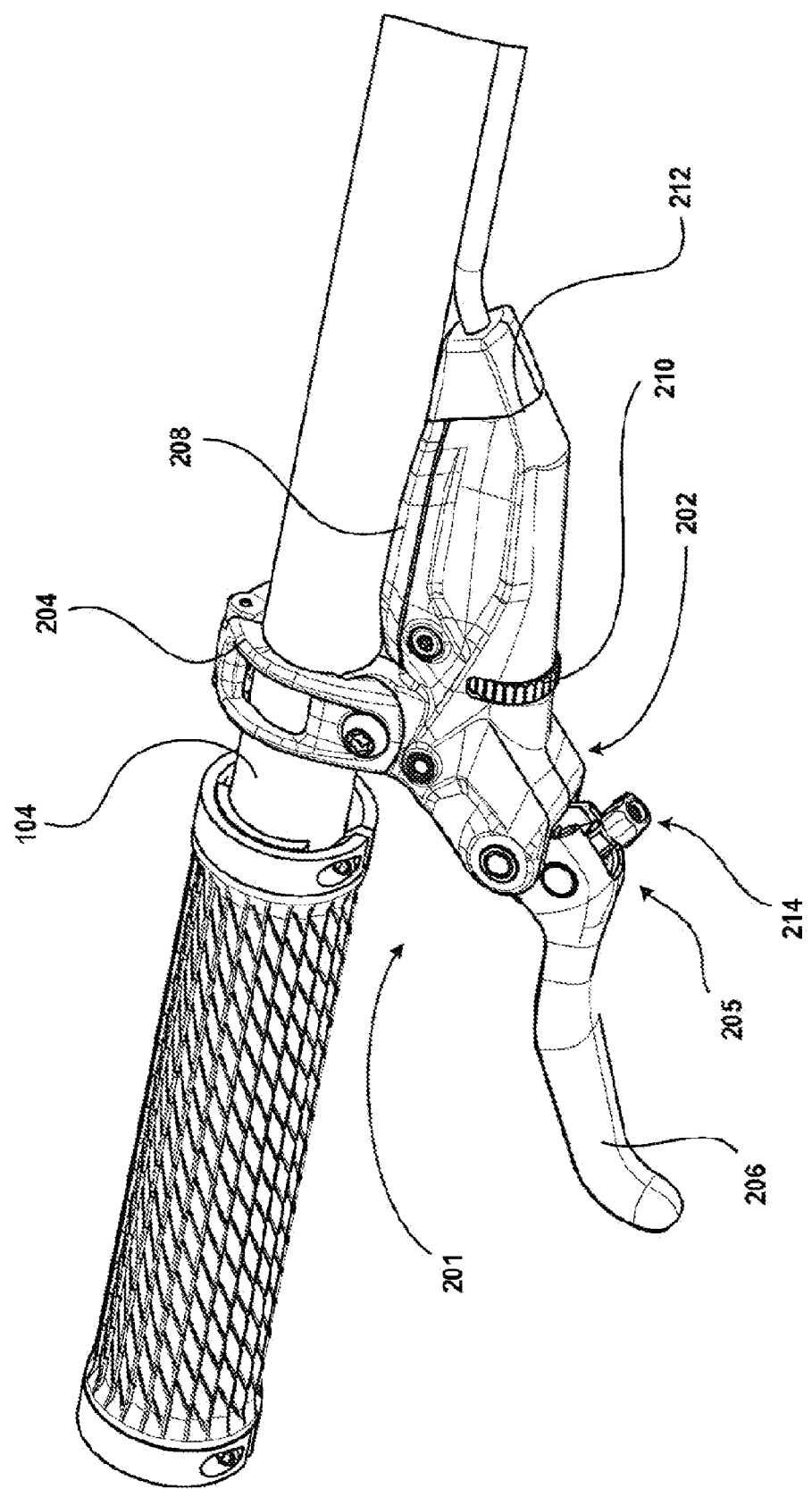
FIG. 2 is a perspective view of a first embodiment of a hydraulic braking control device attached to a handlebar of a bicycle, such as the bicycle of FIG. 1.
Figure 3:
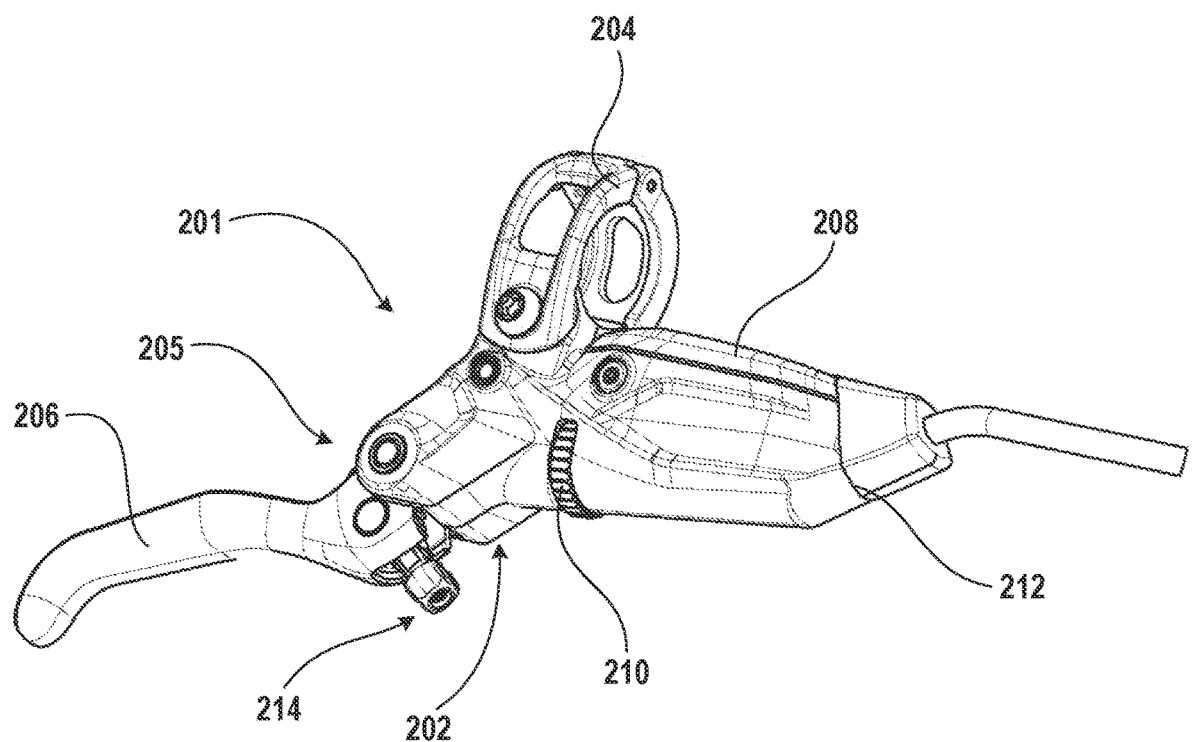
FIG. 3 is a perspective view of the first embodiment of the hydraulic braking control device of FIG. 2, removed from the handlebar.
Figure 4:
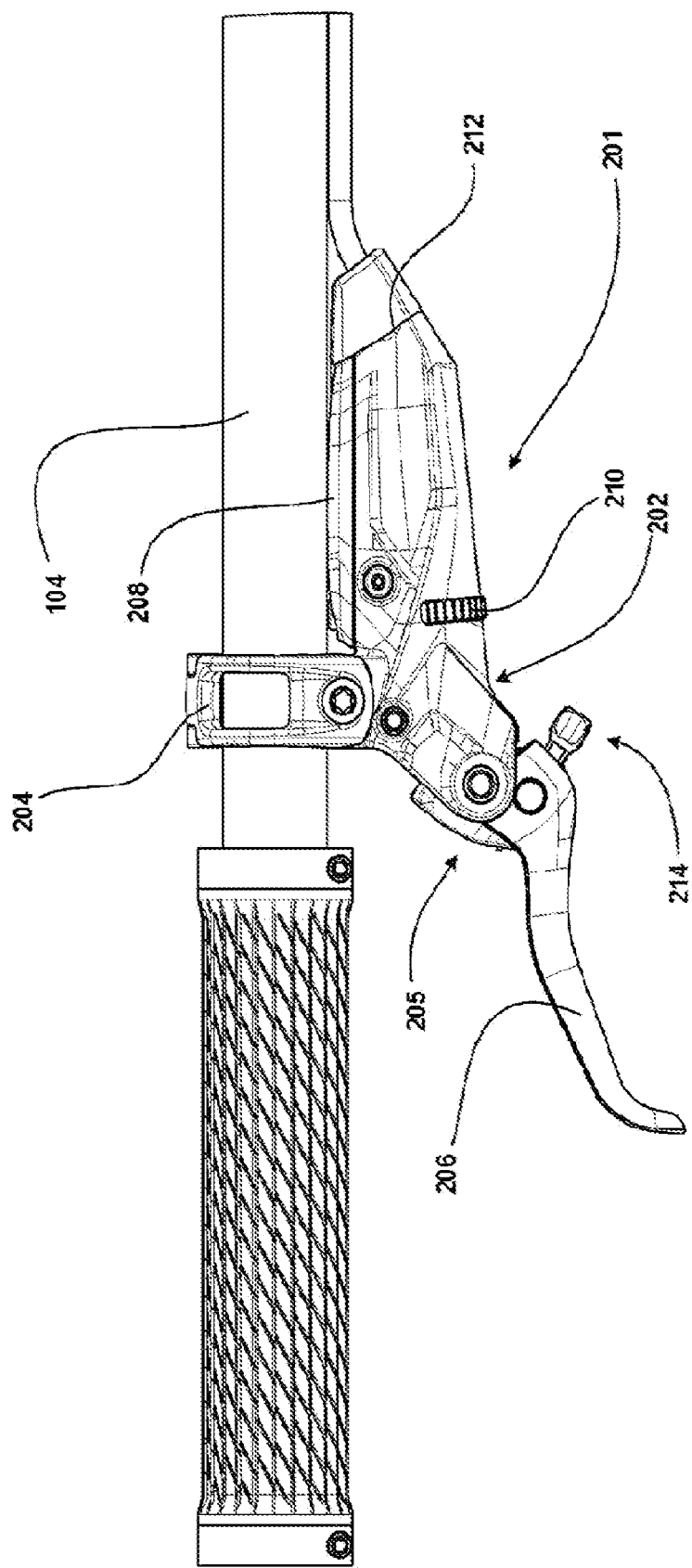
FIG. 4 is a side view of the first embodiment of the hydraulic braking control device attached to the handlebar of FIG. 2.
Figure 5:
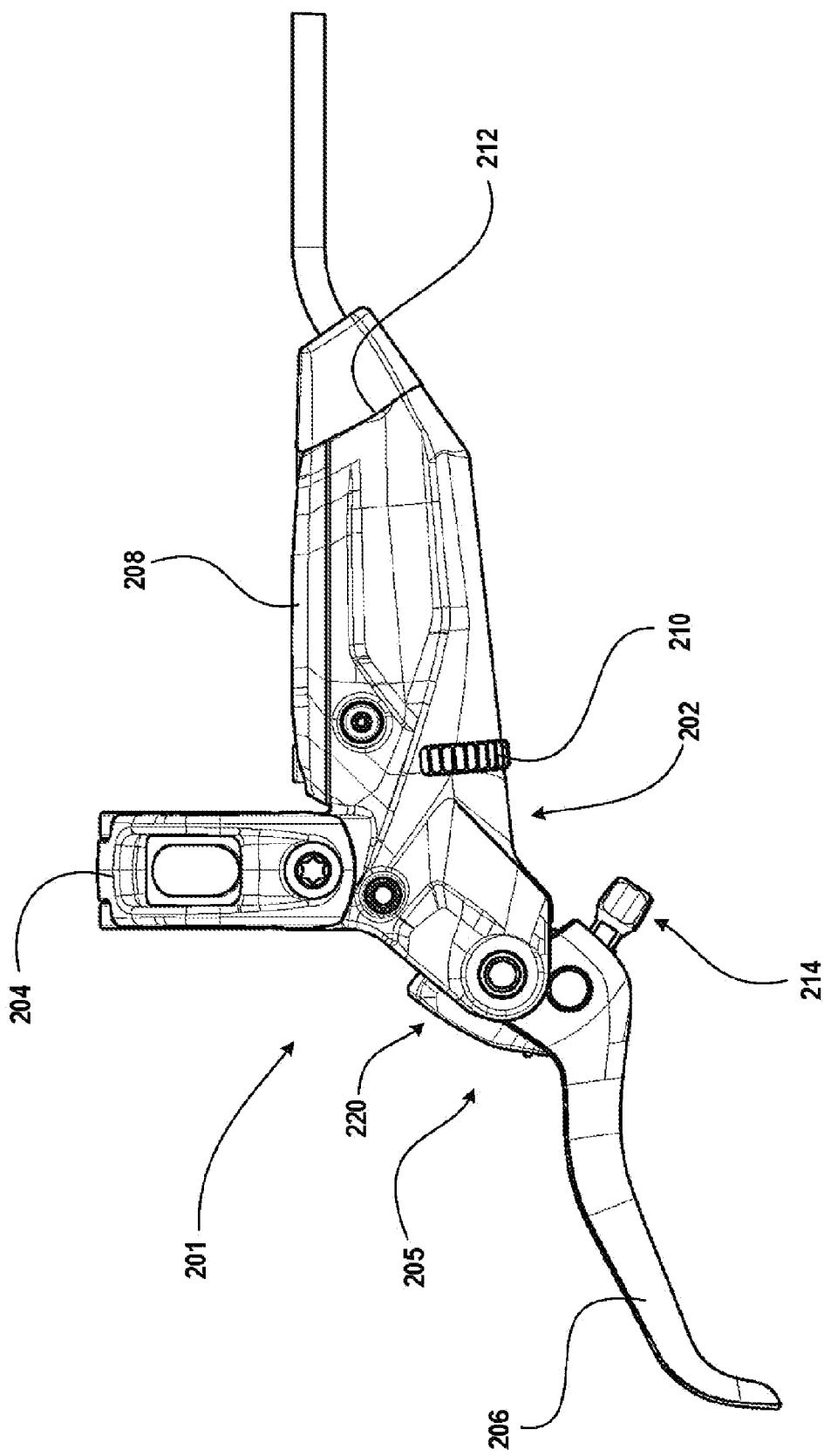
FIG. 5 is a side view of the first embodiment of the hydraulic braking control device of FIG. 3.
Figure 6:
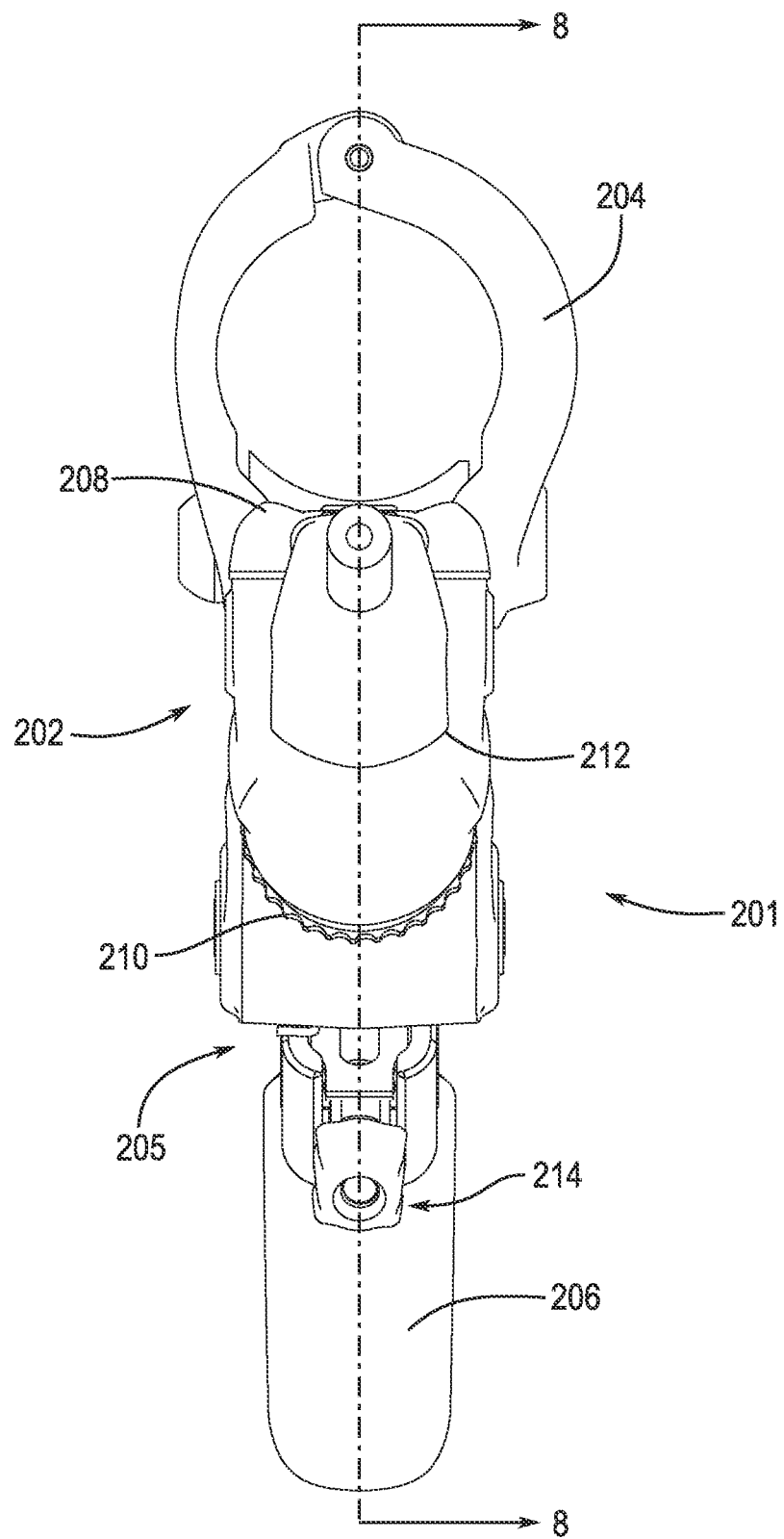
FIG. 6 is a rear view of the first embodiment of the hydraulic braking control device of FIG. 5.
Figure 7:
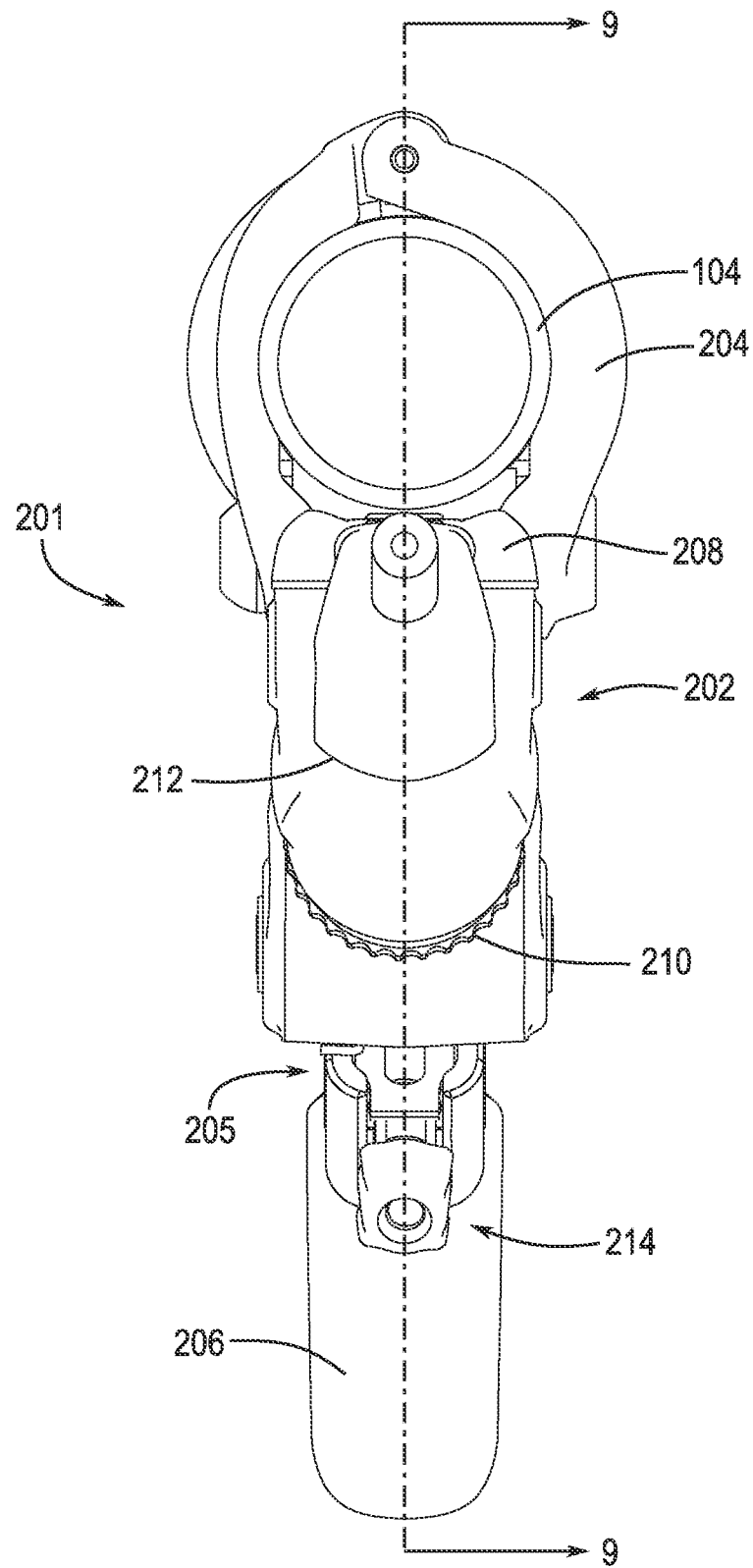
FIG. 7 is a rear view of the first embodiment of the hydraulic braking control device attached to the handlebar of FIG. 4.

With the introduction of wireless shifting and remote technology for bicycles, many cables and housings in the cockpit area of bicycles of the prior art are no longer needed. The elimination of such cables and housing in the cockpit area provides a cleaner overall appearance for the bicycle.

A number of hydraulic brake control devices of the prior art are configured such that an outlet port to which the brake hose is attachable faces away from a handlebar to which the hydraulic brake control device is attached. Hose routing is thus highly visible to a rider, and a brake hose attached to the outlet port of the hydraulic brake control device is visible in a direction of travel and distracts the rider from objects in view.

The present disclosure provides examples of control devices for a bicycle that solve or improve upon one or more disadvantages with prior known hydraulic brake control devices. For example, a hydraulic brake control device has an outlet port, to which a brake hose is attachable, that is in close proximity to a handlebar to which the hydraulic brake control device is attached. The outlet port of the hydraulic brake control device may face the handlebar or may face in a direction that is parallel to an outer surface of the handlebar. The proximity of the outlet port of the brake control device to the handlebar and/or the direction the outlet port faces facilitates hose routing along the outer surface of the handlebar and/or within the handlebar. This improves a field of view for the user in a direction of travel and is less distracting for the rider.

These and other objects, features, and advantages of the disclosed control devices will become apparent to those having ordinary skill in the art upon reading this disclosure. Throughout the drawing figures, where like reference numbers are used, the like reference numbers represent the same or substantially similar parts among the various disclosed examples. Also, specific examples that utilize specific combinations of the disclosed aspects, features, and components of the disclosure are disclosed and described herein. However, it is possible that each disclosed aspect, feature, and/or component of the disclosure may, in other examples not disclosed or described herein, be used independent of or in different combinations with other of the aspects, features, and components of the disclosure.

Turning now to the drawings, FIG. 1 illustrates an example bicycle 100, which may be used to implement handlebar proximal hose attachment and the braking systems disclosed herein. In the illustrated embodiment, the bicycle 100 includes a frame 102, handlebars 104, and a seat 106. The bicycle 100 also includes a first or front wheel 108 and a second or rear wheel 110. The bicycle 100 includes a drive train 112. The drive train 112 of FIG. 1 includes a crank assembly 114 operatively coupled to a rear cassette (not shown) via a chain 118. While the illustrated bicycle 100 is a mountain bicycle, the embodiments disclosed herein may be implemented with other types of bicycles such as, for example, road bicycles. The front and/or forward orientation of the bicycle 100 is indicated by the direction of arrow "A". As such, a forward direction of movement for the bicycle is indicated by the direction of arrow A.

The bicycle 100 of FIG. 1 includes a hydraulic brake system 120. In the illustrated embodiment, the hydraulic brake system 120 includes a first brake lever assembly 122 and/or a second brake lever assembly (not shown). The first brake lever assembly 122 and/or the second brake lever assembly are disposed on the handlebars 104. The first brake lever assembly 122 may include a hydraulic control device for the bicycle 100. As such, the first brake lever assembly 122 is hydraulically coupled to a brake force application device, such as a first brake caliper 124, via a first brake line 126. In the illustrated embodiment, the first brake caliper 124 is operatively coupled to the front wheel 108. The second brake lever assembly may be operatively coupled to a different brake force application device, such as a second brake caliper 128, via a second brake line 130. The second brake caliper 128 is operatively coupled to the rear wheel 110. In other embodiments, the hydraulic brake system 120 includes one or more additional and/or alternative components and/or is configured in other ways. For example, the hydraulic brake system 120 may include alternative and/or additional brake force application devices, such as rim brake calipers, which may be in hydraulic communication with hydraulic braking system control devices.

A first embodiment of a bicycle hydraulic brake control device 201 is shown in FIGS. 2-9 and generally includes a housing 202, and a lever assembly 205 including a lever 206 pivotably attached to the housing 202. In an embodiment, the lever assembly 205 may also include other components, such as a linkage 220 and/or a lever adjusting mechanism 214. The control device 201 may also include a reservoir cover 208 that covers a reservoir, which will be described in greater detail below. Also visible are a piston adjustment knob 210 and the lever adjustment mechanism 214, which are also described in greater detail below. The housing 202 includes a master cylinder that is hydraulically connected to a slave cylinder. The slave cylinder operates a brake force application device, such as a hydraulic caliper (not shown), by a hydraulic line attached to a hydraulic output 212 (e.g., an outlet port). A clamp device 204 (e.g., a support) or any suitable fastener may be part of or attached to the housing 202 for attaching the housing 202 to a handlebar 104 of a bicycle, for example (see FIGS. 2, 4, 6, and 8).

Figure 8:
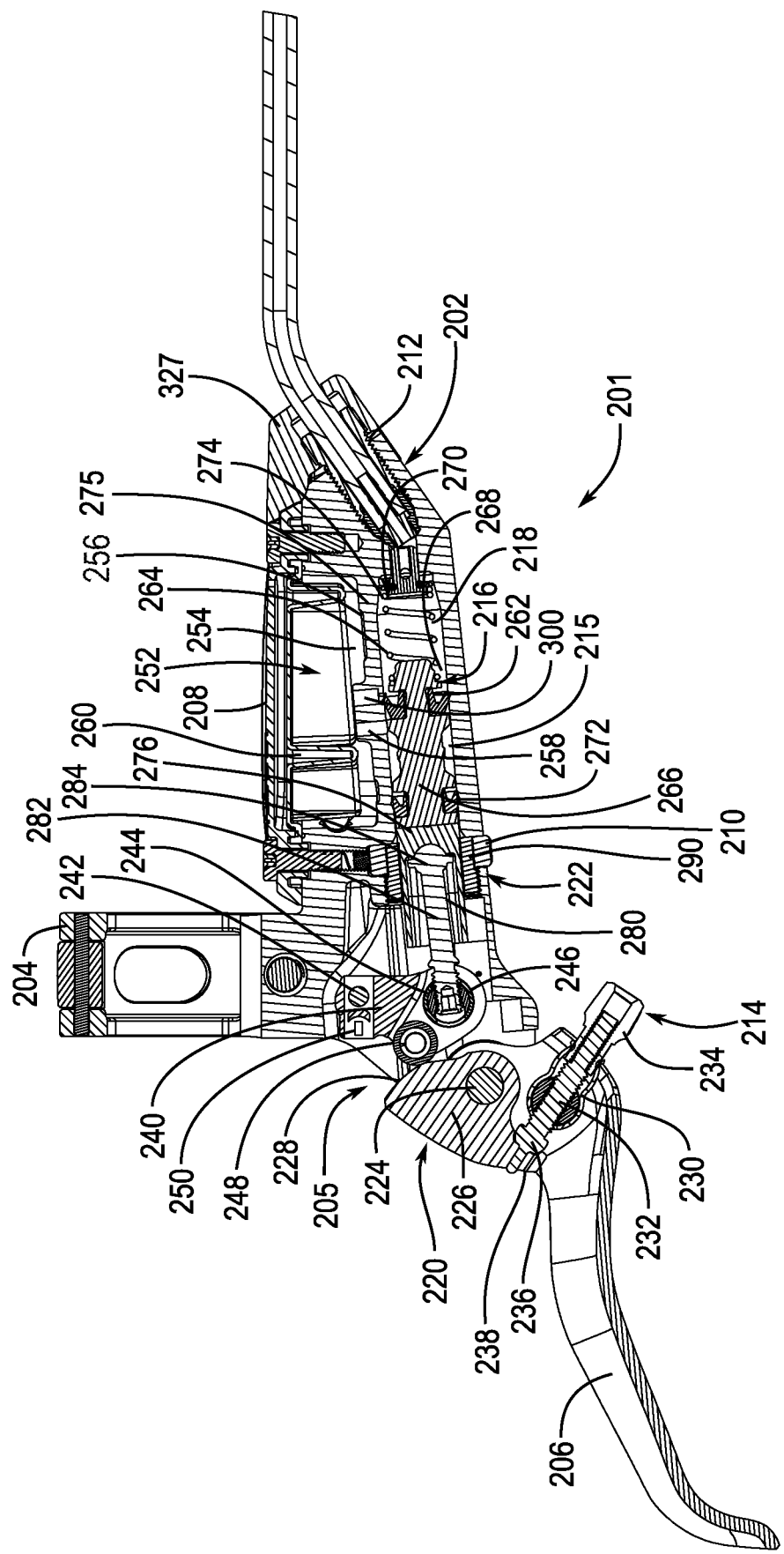
FIG. 8 is a cross-section of the first embodiment of the hydraulic braking control device of FIG. 6, taken along axis 8-8.
Figure 9:
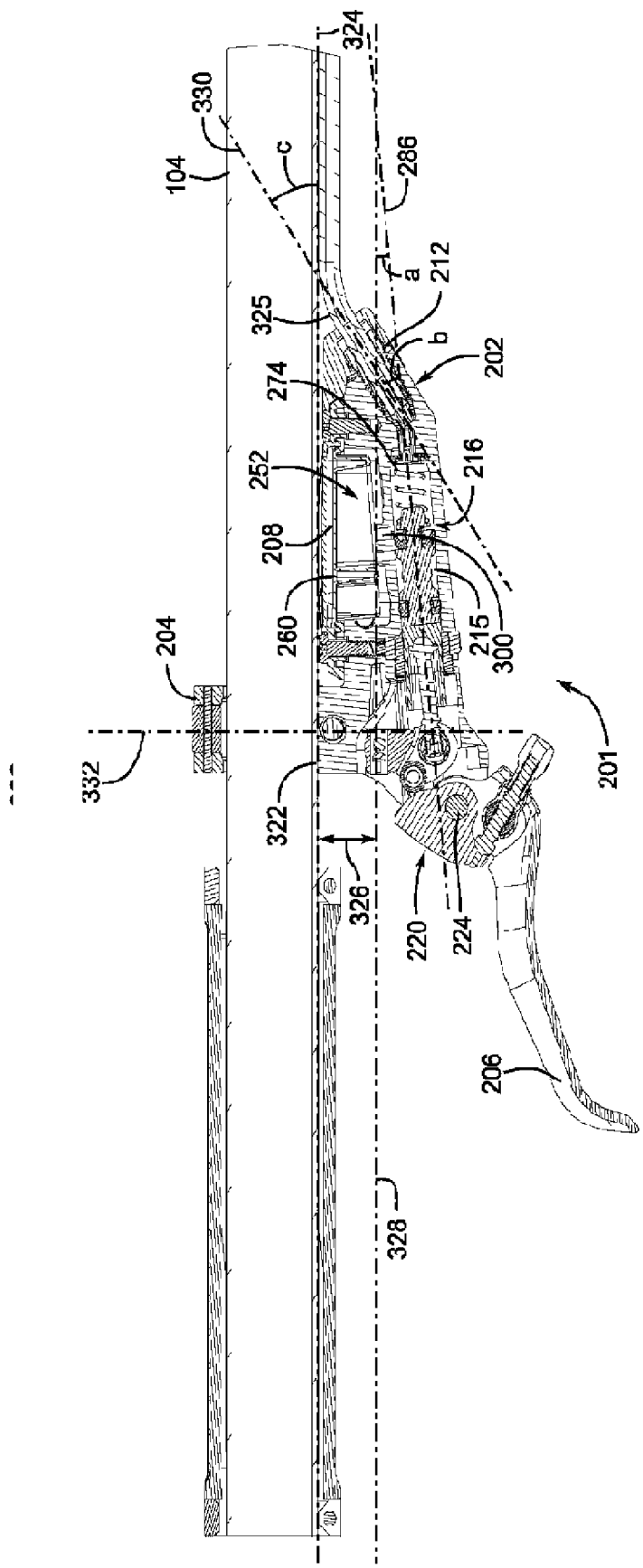
FIG. 9 is a cross-section of the first embodiment of the hydraulic braking control device attached to the handlebar of FIG. 7, taken along axis 9-9.

FIGS. 8 and 9 are cross-sectional views of the first embodiment of the bicycle hydraulic brake control device 201. Referring to FIG. 8, the housing 202 includes a cylinder, which is a bore 215 in the housing 202 in this embodiment. A piston assembly 216 is reciprocally disposed within the bore 215. The bore 215 includes a fluid chamber 218. The linkage 220 operates between the lever 206 and the piston assembly 216 to produce a variable rate of travel of the piston assembly 216. A piston adjustment mechanism 222 operates between the linkage 220 and the piston assembly 216 to adjust the amount of dead band in the system without affecting the operation of the linkage 220.

The lever 206 may be in the form of a blade pivotably attached to the housing 202 of the hydraulic brake control device 201 by a first pin or pivot 224. The lever 206 is pivotable relative to the housing 202 of the hydraulic brake control device 201 via a pivot axis extending through the pivot 224. A cam or cam-shaped link 226 (e.g., a cam link), which is part of one embodiment of the linkage 220, is either formed as part of the lever 206 or pivotally disposed on the first pin 224. The cam 226 has a cam-shaped surface 228 along one portion.

The lever adjusting mechanism 214 may be adjustably attached to the lever 206 on a second pin 230, with the second pin 230 attached to the lever 206. The second pin 230 may be generally outboard from the first pin 224.

The lever adjusting mechanism 214 may include a threaded shaft 232 threadably engaged with the second pin 230. One end of the lever adjusting mechanism 214 includes a grasping part 234 that is accessible and manipulatable by a user. The other end of the lever adjusting mechanism 214 includes a flared end or stop 236. The stop 236 abuts the cam 226 at the end 238 generally opposite the cam surface 228. Twisting the grasping part 234 causes the threaded shaft 232 to either be inserted farther or removed from engagement with the second pin 230; as a result, the distance between the second pin 230 and the adjustment end 238 of the cam 226 changes. In this manner, the orientation of the cam 226 on the lever 206 may be changed, and the position of the lever 206 is altered relative to a handlebar (not shown) when mounted thereon, and/or the housing 202.

The linkage 220 also includes a follower 240. The follower 240 is pivotably disposed on the housing 202. The follower 240 may be disposed on a third pin or pivot 242 attached to the housing 202. The follower 240 includes a fourth pin 244, which is located opposite the third pin 242. The fourth pin 244 may include a threaded bore 246. The follower 240 may include a roller 248, which is rotatably disposed between the third pin 242 and the fourth pin 244. The roller 248 engages the cam surface 228 of the cam link 226. The interaction of the follower 240 and the cam link 226 when the lever 206 is moved causes the piston assembly 216 to travel according to the profile of the cam surface 228. The position of the roller 248 on the cam surface 228 determines the part of the profile of the cam surface 228 actuating the piston assembly 216 in response to movement of the lever 206. The follower 240 may be secured to the third pin 242 with a locknut 250.

The housing 202 may be any suitable shape that defines a hollow interior including the bore 215, and accommodates the mounting of and operation of the linkage 220. The housing 202 may be made of any suitable material including, for example, metal, plastic, fiber-resin based composite materials, or combinations thereof. The bore 215 includes a fluid chamber 218. The fluid chamber 218 includes hydraulic fluid (e.g. brake fluid) as is known.

The illustrated bicycle hydraulic brake control device 201 is an "open" type of fluid system. The bicycle hydraulic brake control device 201 includes a reservoir 252. The reservoir 252 includes a reservoir chamber 254 defined in a portion of the housing 202 in communication with the fluid chamber 218. Extending through the bore wall 256 between the reservoir chamber 254 are timing ports 300 and a compensating port 258. A diaphragm or seal 260 (e.g., a first reservoir cover) made of an elastomeric material such as, for example, silicon rubber is made to cover the reservoir chamber 254 and at least partially defines the reservoir chamber 254, such that the reservoir chamber 254 has a variable volume. The reservoir cover 208 (e.g., a second reservoir cover) defines an outer surface of the bicycle hydraulic brake control device 201 and covers the diaphragm or seal 260. The reservoir cover 208 may be made of any material of materials including, for example, a same material of which the housing 202 is made. For example, the reservoir cover 208 may be made of metal, plastic, fiber-resin based composite materials, or combinations thereof.

Pivoting the lever 206 from a rest position causes the piston assembly 216 to drive a piston 266 into the bore 215. As the piston 266 moves in a cylinder or bore 215, a leading seal 262, which may, for example, be a cup or umbrella seal, covers the timing ports 300, which pressurizes the fluid within the output 212 at the end of the fluid chamber 218 and in turn actuates a slave cylinder within a hydraulically coupled brake force application device, such as a brake caliper (not shown). When the lever 206 is released, a piston assembly biasing element 264 biases the piston 266 toward a first end 268 of the fluid chamber 218, away from a second end 270 of the fluid chamber 218, to reassume a rest or home position for the piston 266. A distance between a leading edge of the leading seal 262 when the piston is in the home position and a fluid chamber sealing timing port 300 is a "dead-band" of the stroke of the piston 266 and/or the leading seal 262. Specifically, during movement of the piston 266 and the leading seal 262 through the dead band (e.g., the part of lever actuation where the cup seal 262 is between the timing ports 300 and the first end of the fluid chamber 268), hydraulic fluid in the reservoir 252 between the seal 262 and the timing ports 300 returns to the reservoir 252. The diaphragm 260 of the reservoir 252 may expand to allow for the increase in fluid passing from the fluid chamber 218 to the reservoir 252. During this part of lever actuation, and associated piston stroke, the second end 270 of the fluid chamber 218 is not pressurized to provide braking forces at the brake force application device. The length of the dead-band may be adjustable in accordance with user preferences. For example, the length of the dead-band may be adjusted by the user with the movable member 210.

One or more timing ports 300 are disposed along the length of the cylinder 215. The timing ports 300 may be any shape, size, or orientation. In an embodiment, the timing ports 300 are oval and/or generally circular and have a diameter of 0.4 millimeters or less. For example, a sealing port of a group of timing ports 300 may be sized at 0.4 millimeters or less. In another embodiment, the timing ports 300 may be different sizes, with at least one timing port 300 having a diameter of 0.4 millimeters or less. In yet another embodiment all or a majority of the timing ports 300 may have a diameter of 0.4 millimeters or less.

To accommodate the volume of fluid within the fluid chamber 218 that will be displaced into the reservoir 252 during movement of the piston 266 through the dead band, multiple timing ports 300 may be used. At least two of these timing ports 300 are at different positions along the bore 215 relative to the second end 270 and/or the first end 268 of the fluid chamber 218. The timing port or ports 300 located closest to the second end 270 of the fluid chamber 218 will define the end of the dead band of the stroke. When the last of the timing ports 300 within the fluid chamber 218 is sealingly engaged, a fluid pressure chamber is formed, as is described further below.

The piston assembly 216 is disposed in the bore or cylinder 215 to partially define the fluid chamber 218. The piston 266 may be provided with one or more seals 262, 272. A leading seal 262 sealingly engages a wall 275 of the bore 215 to create and/or define a fluid pressure chamber 274, and reciprocates throughout a stroke of the leading seal 262, or the piston 266, to generate and/or relieve pressure at the output 212. The seals 262, 272 may be any type of seals. For example, O-rings or umbrella seals may be used. Where two seals 262, 272 are used, the rearmost 272 of the seals may be considered to define, with the piston 266 and the wall 275 of the bore 215, the fluid chamber 218 (i.e. the volume of the bore that includes fluid).

The piston assembly 216 is constructed and positioned within the bore 215 to reciprocate along a piston or cylinder axis 286 (see FIG. 9). The piston assembly 216 may be biased in a rest or home position by the piston assembly biasing element 264, which may be a spring, such as a coil spring as shown. The action of the biasing element 264 may also return the lever 206 to a rest or home position.

The piston assembly 216 may include a separate cap member 276. The cap member 276 may be a barrel shaped piece that fits within the bore 215 and abuts a proximal end of the piston 266. The cap member 276 may include a flange or the like at or near an end abutting the piston 266. The cap member 276 may also include a non-round interior 280 that may be in the form of a key hole or similar shape.

A pushrod 282 is connected to the follower 240 at one end and contacts the piston assembly 216 at the other end. The pushrod 282 includes a head 284. The head 284 includes a ball surface received in a corresponding interior 280 of the cap member 276 of the piston assembly 216 in a keyed relationship. The pushrod 282 may be threadably engaged with the threaded bore 246 of the fourth pin 244 at an end opposite the head 284.

The piston assembly 216 may be a single-piece as shown, or may be formed as multiple pieces. In one embodiment, the piston 266 may be a separate part of the piston assembly 216. Alternatively, the piston 266 may be formed as a single-piece construction with the cap member 276.

In the embodiment shown, the control device 201 includes a piston adjustment mechanism 222 that is disposed in the housing 202 to adjust the dead band portion of the piston stroke. The piston adjustment mechanism 222 includes a sleeve member 290 that is disposed about and keyed to the cap member 276. The sleeve member 290 is also threadably engaged in the bore 215 of the housing 202. The sleeve member 290 may be turned by the manually movable member or knob 210 that is keyed to the sleeve member 290. The movable member 210, when rotated, causes axial movement of the sleeve member 290, and movement of the sleeve member causes axial movement of the cap member 276 through interaction of the sleeve member 290 with the flange of the cap member 276.

At the same time that the sleeve member 290 is moved axially, the pushrod 282 is translated axially a same amount and in a same direction as the cap member 276 by the threaded engagement of the pushrod 282 in the fourth pin 244. In this way, no slack or lash is created by adjustment of the dead band with the piston adjustment mechanism 222. Also, the positions of the elements of the linkage 220 are unaffected. As such, the adjustment of the lever adjustment mechanism 214 is independent of the adjustment of the dead band adjustment of the piston adjustment mechanism 222. The piston adjustment mechanism 222 operates in correlation to one or more sealing timing ports of a group of timing ports 300 to define the length of the dead band piston stroke.

Referring to FIG. 9, the linkage 220 is operated by movement of the lever 206, which in turn causes the piston assembly 216 to move along the cylinder axis 286 of the bore 215 and sealingly engage a series of timing ports 300. Once a last timing port 300 along the cylinder axis 286 is sealingly engaged, further movement of the piston in the pressurizing direction generates fluid pressure within the fluid pressure chamber 274.

The clamp device 204 has an inner annular surface 322 that abuts the handlebar 104 when the bicycle hydraulic brake control device 201 is attached to the handlebar 104 via the clamp device 204. The inner annular surface 322 defines a clamp surface axis 324 that extends longitudinally along the inner annular surface 322.

The bicycle hydraulic brake control device 201 is configured such that a hydraulic line 325 (e.g., a brake hose) is attached to the hydraulic output 212 in close proximity to the handlebar 104. This allows routing of the hydraulic line 325 (i.e., hose routing) to be close to the handlebar 104 for an improved view for a rider of the bicycle 100. In other words, there is no brake hose 325 in a view of the rider in a direction of travel to distract the rider. Further, the bicycle hydraulic brake control device 201 is configured such that the housing 202 of the bicycle hydraulic brake control device 201 is close to the handlebar 104 and less visible to the rider compared to bicycle hydraulic brake control devices of the prior art.

The bicycle hydraulic brake control device 201 may also include a hydraulic output cover 327 to protect the connection between the hydraulic line 325 and the hydraulic output 212 from the environment (e.g., moisture and dirt) and help guide the hydraulic line 325 to the handlebar 104. The hydraulic output cover 327 abuts the handlebar 104 when the hydraulic output cover 327 is attached to the housing 202 of the bicycle hydraulic brake control device 201 and the bicycle hydraulic brake control device 201 is attached to the handlebar 104. The hydraulic output cover 327 is attachable to the housing 202 of the bicycle hydraulic brake control device 201 in any number of ways including, for example, with a press fit and/or with one or more connectors. The hydraulic output cover 327 may be removable and may be made of any number of materials including, for example, rubber, metal, plastic, fiber-resin based composite materials, or combinations thereof. In one embodiment, the hydraulic output cover 327 is made of a same material as the housing 202 of the bicycle hydraulic brake control device 201.

As an example, a handlebar proximity zone 326 is defined relative to the clamp surface axis 324, and the bicycle hydraulic brake control device 201 is configured such that the diaphragm or seal 260 and/or the reservoir cover 208 is within the handlebar proximity zone 326. In one embodiment, all of the reservoir cover 208 is within the handlebar proximity zone 326, and part of the diaphragm or seal 260 is within the handlebar proximity zone 326. In another embodiment, part of the reservoir cover 208 is within the handlebar proximity zone 326, and part of the diaphragm or seal 260 is within the handlebar proximity zone 326. In yet another embodiment, all of the reservoir 252 and/or at least part of the bore 215 is within the handlebar proximity zone 326.

A radially outer limit 328 of the handlebar proximity zone 326 is radially outer relative to the clamp surface axis 324 and is at a predetermined distance relative to the clamp surface axis 324. The radially outer limit 328 of the handlebar proximity zone 326 may be at any number of distances relative to the clamp surface axis 324 such as, for example, two centimeters, three centimeters, or 3.5 centimeters. Other distances between the radially outer limit 328 and the clamp surface axis 324 (e.g., four centimeters) may be provided. The handlebar proximity zone 326 may be a rectangular area defined by the clamp surface axis 324 and the radially outer limit 328 or a hollow cylindrical volume defined by an inner radius corresponding to the clamp surface axis 324 and an outer radius corresponding to the radially outer limit 328.

Other components of the bicycle hydraulic brake control device 201 may be within the handlebar proximity zone 326. For example, in other embodiments, the pivot 224 may be within the handlebar proximity zone 326. In other words, the pivot axis about which the lever 206 is pivotable relative to the housing 202 of the bicycle hydraulic brake control device 201 may be offset 3 cm or less relative to the clamp surface axis 324.

In addition to the reservoir cover 208 and the diaphragm or seal 260, and thus the reservoir 252, being close to the handlebar 104, as discussed above, the hydraulic output 212 may face towards the handlebar 104. The hydraulic output 212 is, for example, an outlet port of the bicycle hydraulic brake control device 201 that is connectable to a hydraulic line (e.g., the hydraulic line 325). The hydraulic output 212 has an outlet port axis 330 that is a central axis extending through the hydraulic output 212. In the embodiment shown in FIGS. 2-9, the outlet port axis 330, the cylinder axis 286, and the clamp surface axis 324 may be coplanar.

The outlet port axis 330 may be different than the cylinder axis 286. In other words, the cylinder axis 286 may not be in line with the outlet port axis 330. For example, as shown in the embodiment of FIG. 9, the cylinder axis 286 is at a positive acute angle (e.g., positive acute angle a in FIG. 9) relative to the clamp surface axis 324, and the outlet port axis 330 is at a first positive acute angle (e.g., positive acute angle b in FIG. 9) relative to the cylinder axis 286 and a second positive acute angle relative to the clamp surface axis 324 (e.g., positive acute angle c in FIG. 9), such that the hydraulic output 212 faces towards the handlebar 104. For example, the cylinder axis 286 may be at a 20 degree angle relative to the clamp surface axis 324, the outlet port axis 330 may be at a 30 degree angle relative to the cylinder axis 286, and the outlet port axis 330 may be at a 50 degree angle relative to the clamp surface axis 324. Other relative angles may be provided. As another example, the cylinder axis 286 may be at a 15 degree angle relative to the clamp surface axis 324, the outlet port axis 330 may be at a 15 degree angle relative to the cylinder axis 286, and the outlet port axis 330 may be at a 30 degree angle relative to the clamp surface axis 324. With such configurations, the hydraulic line 325 connected to the hydraulic output 212 extends away from the hydraulic output 212 and towards the handlebar 104. Once the hydraulic line 325 (e.g. a brake hose) reaches the handlebar 104, the hydraulic line 325 may then be routed along the handlebar 104, within and/or on the handlebar 104, out of the view of the rider.

The inner annular surface 322 of the clamp device 204 further defines a clamp plane 332. The clamp plane 332 is perpendicular to the clamp surface axis 324 and intersects the inner annular surface 322 of the clamp device 204. As shown in the embodiment of FIG. 9, the reservoir 252 and the hydraulic output 212, and the lever 206 and the pivot 224 are on opposite sides of the clamp plane 332. This configuration spreads components of the bicycle hydraulic brake control device 201 out along the handlebar 104, such that components of the bicycle hydraulic brake control device 201 such as, for example, the lever 206 and the hydraulic output 212 may be positioned adjacent to the handlebar 104 when the bicycle hydraulic brake control device 201 is attached to the handlebar 104 via the clamp device 204. This configuration of the bicycle hydraulic brake control device 201 provides a bicycle hydraulic brake control device that is less visible to the rider.

Figure 10:
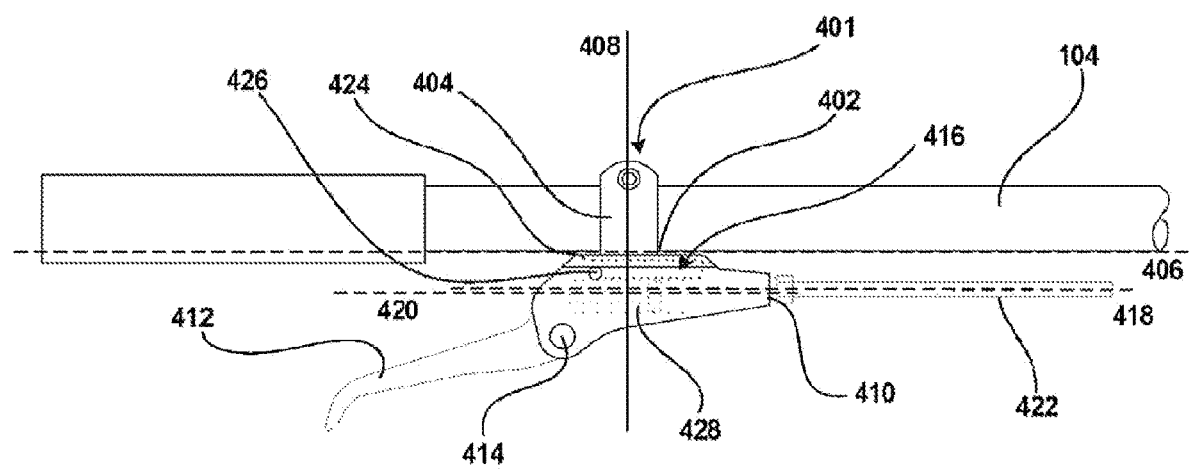
FIG. 10 is a side view of a second embodiment of a hydraulic braking control device attached to a handlebar of a bicycle, such as the bicycle of FIG. 1.

A second embodiment of a bicycle hydraulic brake control device 401 is shown in FIG. 10. An inner annular surface 402 of a clamp device 404 of the bicycle hydraulic brake control device 401 defines a clamp surface axis 406 and a clamp plane 408. The clamp plane 408 is perpendicular to the clamp surface axis 406 and intersects the inner annular surface 402 of the clamp device 404. A hydraulic output 410 (e.g., an outlet port), and a lever 412 and a pivot 414 of the bicycle hydraulic brake control device 401 are on opposite sides of the clamp plane 408. Unlike the embodiment of FIGS. 2-9 discussed above, however, a reservoir 416 of the bicycle hydraulic brake control device 401 extends on both sides of the clamp plane 408. In other words, the clamp plane 408 intersects the reservoir 416.

The embodiment of the bicycle hydraulic brake control device 401 shown in FIG. 10 further differs from the embodiment of FIGS. 2-9 in that an outlet port axis 418 does not extend towards the handlebar 104. Instead, the outlet port axis 418 is parallel with the clamp surface axis 406. In one embodiment, the outlet port axis 418 is also parallel with a cylinder axis 420. The hydraulic output 410 and the outlet port axis 418, however, are in close proximity to the handlebar 104 (e.g., within a handlebar proximity zone), such that a hydraulic line 422 may be routed close to the handlebar 104. The close proximity of the hydraulic output 410 to the handlebar 104 may be provided due to a size, shape, and/or orientation of the reservoir 416. For example, the reservoir 416 may be adjacent to the handlebar 104 in that a reservoir cover 424 covering the reservoir 416 may abut the handlebar 104 when the bicycle hydraulic brake control device 401 is attached to the handlebar 104. Further, a length of the reservoir 416 may extend in a direction parallel to the clamp surface axis 406.

The bicycle hydraulic brake control device 401 also includes a bleed port 426 in fluid communication with the reservoir 416. The bleed port 426 is positioned in proximity to the handlebar 104 (e.g., adjacent to the handlebar 104, within a handlebar proximity zone) and at a high point in the reservoir 416, for improved air removal during a bleeding process compared to other bicycle hydraulic brake control devices. For example, the bleed port 426 is closer to the clamp surface axis 406 than the cylinder axis 420 is relative to the clamp surface axis 406. The reservoir 416 is in close proximity to the handlebar 104 and above a bore 428 for optimal performance of the reservoir 416 in trapping air in brake fluid from entering high pressure fluid. The bleed port 426 may be located adjacent to (e.g., within 0.1 or 0.2 cm) the reservoir cover 424, which, for example, defines an outer surface of the bicycle hydraulic brake control device 401 and covers a diaphragm or seal within the bicycle hydraulic brake control device 401. In the embodiment shown in FIG. 10, the bleed port 426 and the outlet port 410 are on opposite sides of the clamp plane 408. The bicycle hydraulic brake control device 201 shown in FIGS. 2-9 may also include a bleed port 426 in a same or similar position relative to the handlebar 104 and/or the reservoir 252 as shown in FIG. 10. Other configurations of the bleed port 426 may be provided.

Figure 11:
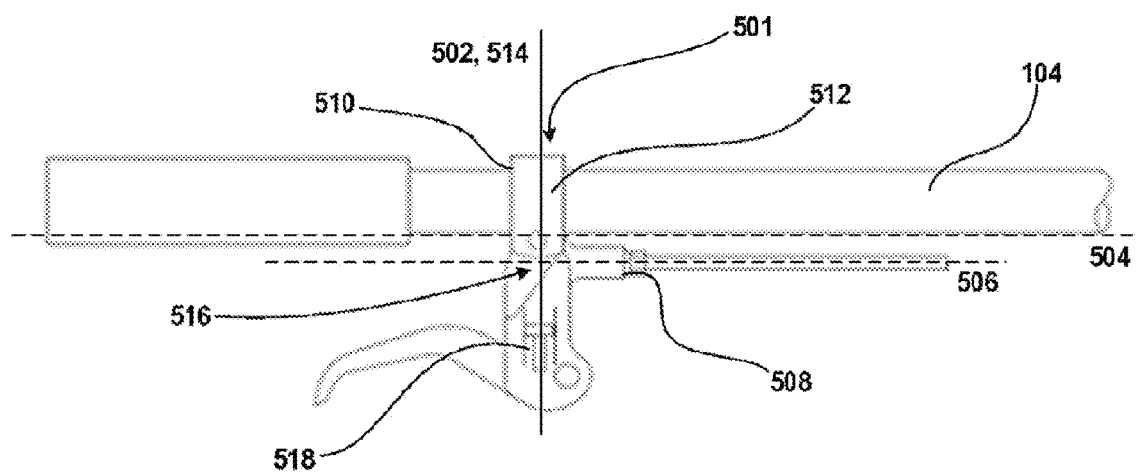
FIG. 11 is a side view of a third embodiment of a hydraulic braking control device attached to a handlebar of a bicycle, such as the bicycle of FIG. 1.

A third embodiment of a bicycle hydraulic brake control device 501 is shown in FIG. 11. The embodiment shown in FIG. 11 differs from the embodiment shown in FIG. 10 in that a cylinder axis 502 is perpendicular to a clamp surface axis 504 and perpendicular to an outlet port axis 506 extending through an outlet port 508 of the bicycle hydraulic brake control device 501. An inner annular surface 510 of a clamp device 512 of the bicycle hydraulic brake control device 501 defines the clamp surface axis 504 and a clamp plane 514. The clamp plane 514 is perpendicular to the clamp surface axis 504 and intersects the inner annular surface 510 of the clamp device 512. The outlet port 508 and the outlet port axis 506 are in close proximity to the handlebar 104 (e.g., within a handlebar proximity zone). Unlike the embodiment of FIGS. 2-9, a reservoir 516 and a cylinder 518 of the bicycle hydraulic brake control device 501 respectively extend on both sides of the clamp plane 514. In other words, the clamp plane 514 intersects the reservoir 516 and the cylinder 518. The reservoir 516 is, for example, in line with the cylinder 518 and disposed between the cylinder 518 and the handlebar 104 when the bicycle hydraulic brake control device 501 is attached to the handlebar 104.

Figure 12:
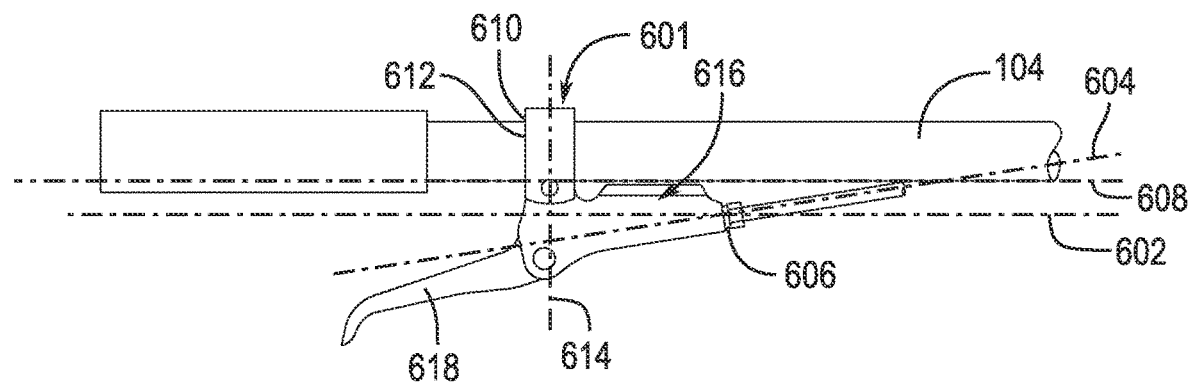
FIG. 12 is a side view of a fourth embodiment of a hydraulic braking control device attached to a handlebar of a bicycle, such as the bicycle of FIG. 1.

A fourth embodiment of a bicycle hydraulic brake control device 601 is shown in FIG. 12. The embodiment shown in FIG. 12 differs from the embodiment shown in FIG. 10 in that a cylinder axis 602 and/or an outlet port axis 604 extending through an outlet port 606 of the bicycle hydraulic brake control device 601 is angled towards a clamp surface axis 608. For example, the outlet port axis 604 is at a positive acute angle (e.g., 15 degrees, 20 degrees, or 25 degrees) relative to the clamp surface axis 608, such that the outlet port 606 faces the handlebar 104. In one embodiment, the cylinder axis 602 and the outlet port axis 604 are both at positive acute angles relative to the clamp surface axis 608, respectively.

An inner annular surface 610 of a clamp device 612 of the bicycle hydraulic brake control device 601 defines the clamp surface axis 608 and a clamp plane 614. The clamp plane 614 is perpendicular to the clamp surface axis 608 and intersects the inner annular surface 610 of the clamp device 612. The outlet port 606 is in close proximity to the handlebar 104 (e.g., within a handlebar proximity zone). A reservoir 616 of the bicycle hydraulic brake control device 601 and at least part of a lever 618 of the bicycle hydraulic brake control device 601 extend away from opposite sides of the clamp plane 614, respectively.

Figure 13:
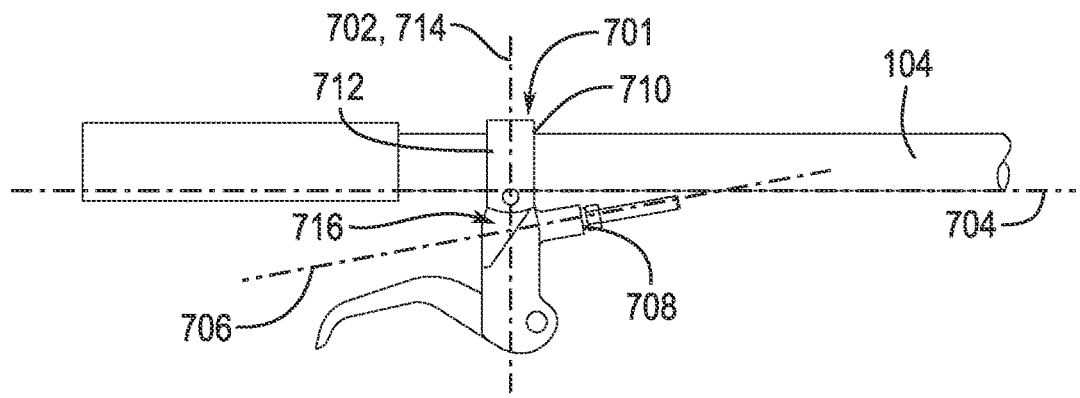
FIG. 13 is a side view of a fifth embodiment of a hydraulic braking control device attached to a handlebar of a bicycle, such as the bicycle of FIG. 1.

A fifth embodiment of a bicycle hydraulic brake control device 701 is shown in FIG. 13. The embodiment shown in FIG. 13 differs from the embodiment shown in FIG. 12 in that a cylinder axis 702 is perpendicular to a clamp surface axis 704. Similar to the embodiment of FIG. 12, an outlet port axis 706 extending through an outlet port 708 of the bicycle hydraulic brake control device 701 is at a positive acute angle relative to the clamp surface axis 704. An inner annular surface 710 of a clamp device 712 of the bicycle hydraulic brake control device 701 defines the clamp surface axis 704 and a clamp plane 714. The clamp plane 714 is perpendicular to the clamp surface axis 704 and intersects the inner annular surface 710 of the clamp device 712. The outlet port 708 is in close proximity to the handlebar 104 (e.g., within a handlebar proximity zone). Similar to the embodiment shown in FIG. 11, a reservoir 716 and a cylinder of the bicycle hydraulic brake control device 701 respectively extend on both sides of the clamp plane 714. In other words, the clamp plane 714 intersects the reservoir 716. The reservoir 716 is, for example, in line with the cylinder and disposed between the cylinder and the handlebar 104 when the bicycle hydraulic brake control device 701 is attached to the handlebar 104.

Figure 14:
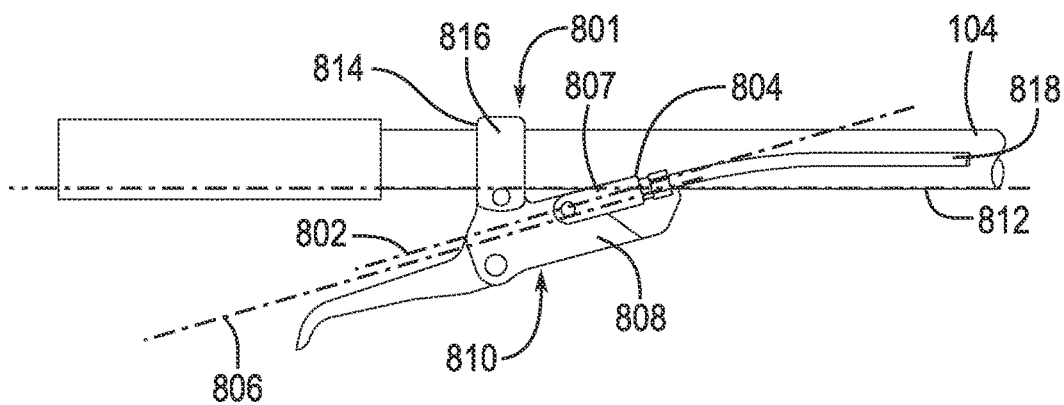
FIG. 14 is a side view of a sixth embodiment of a hydraulic braking control device attached to a handlebar of a bicycle, such as the bicycle of FIG. 1.
Figure 15:
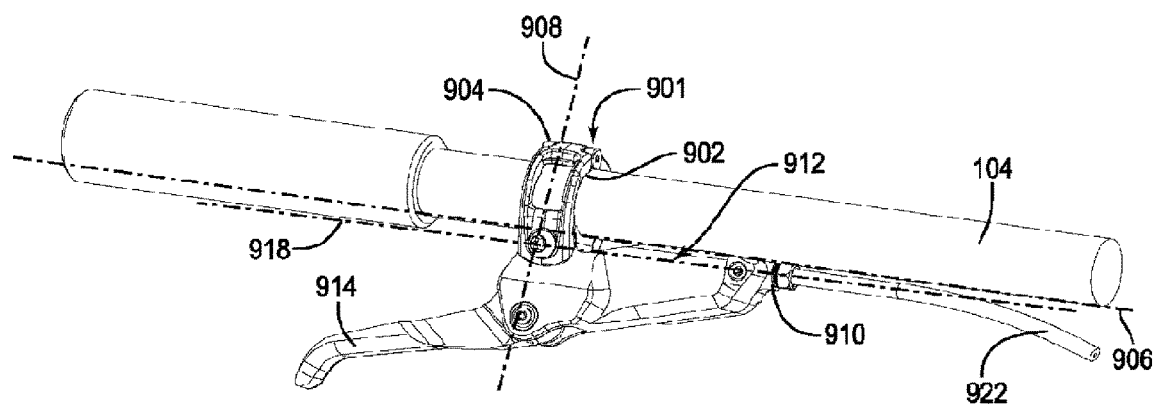
FIG. 15 is a first perspective view of a seventh embodiment of a hydraulic braking control device attached to a handlebar of a bicycle, such as the bicycle of FIG. 1.
Figure 16:
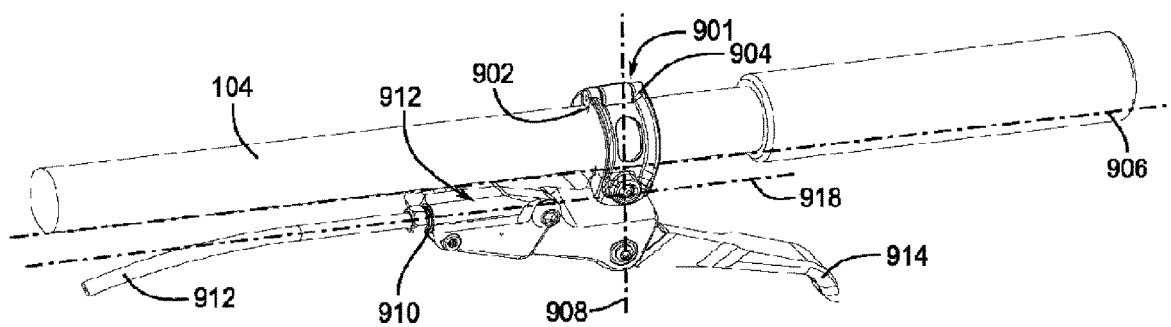
FIG. 16 is a second perspective view of the seventh embodiment of the hydraulic braking control device attached to the handlebar of FIG. 15.

A sixth embodiment of a bicycle hydraulic brake control device 801 is shown in FIG. 14. The embodiment shown in FIG. 14 differs from the embodiment shown in FIGS. 2-9 in that an outlet port axis 802 extending through an outlet port 804 of the bicycle hydraulic brake control device 801 is offset relative to a cylinder axis 806. For example, a support 807 is attached (e.g., rotatably attached via one or more connectors) to an outer surface 808 of a housing 810 of the bicycle hydraulic brake control device 801. The support 807 is hollow and is in fluid communication with a fluid chamber within the bicycle hydraulic brake control device 801. The outlet port 804 is supported by the support 807, such that the outlet port axis 802 is offset relative to the cylinder axis 806. The outlet port axis 802 is thus not coaxial with the cylinder axis 806.

In one embodiment, the cylinder axis 806 and a clamp surface axis 812 defined by an inner annular surface 814 of a clamp device 816 of the bicycle hydraulic brake control device 801 define a cylinder plane. The outlet port axis 802 is offset relative to the cylinder axis 806, such that the outlet port axis 802 is non-coplanar with the cylinder plane.

The outlet port axis 802 is angled towards the handlebar 104. In other words, the outlet port axis 802 is at a positive acute angle relative to the clamp surface axis 812. The rotatability of the support 807 relative to the housing 810 of the bicycle hydraulic brake control device 801, for example, and the offset of the outlet port axis 802 relative to the cylinder axis 806 may facilitate the positioning of a hydraulic line 818 along and/or within the handlebar 104. The outlet port 804 abuts or is in close proximity to the handlebar 104 (e.g., within a handlebar proximity zone).

A seventh embodiment of a bicycle hydraulic brake control device 901 is shown in FIGS. 15-19. An inner annular surface 902 of a clamp device 904 of the bicycle hydraulic brake control device 901 defines a clamp surface axis 906 and a clamp plane 908. The clamp plane 908 is perpendicular to the clamp surface axis 906 and intersects the inner annular surface 902 of the clamp device 904. A hydraulic output 910 (e.g., an outlet port) and a reservoir 912, and at least part of a lever 914 (see FIG. 18) of the bicycle hydraulic brake control device 901 are on opposite sides of the clamp plane 908.

Figure 17:
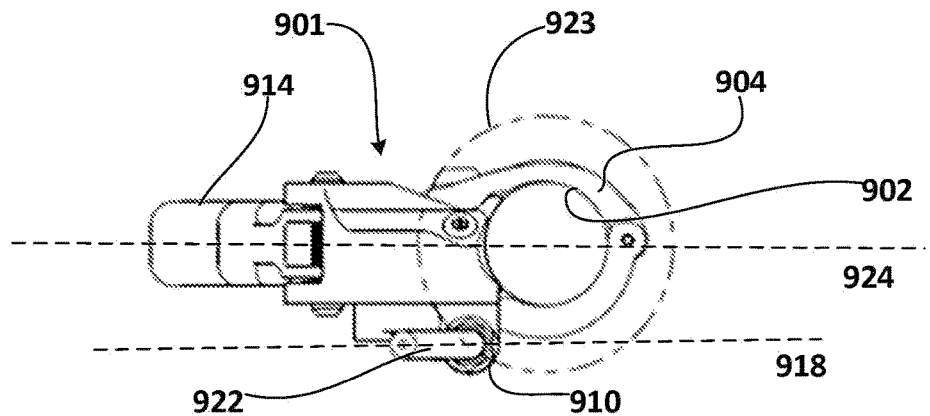
FIG. 17 is a front view of the seventh embodiment of the hydraulic braking control device attached to the handlebar of FIG. 15.

The embodiment of the bicycle hydraulic brake control device 901 shown in FIGS. 15-19 differs from the embodiment of FIGS. 2-9 in that an outlet port axis 918 (e.g., a central axis through the hydraulic output 910) does not face the handlebar 104. Instead, the outlet port axis 918 is parallel with the clamp surface axis 906. The hydraulic output 910 and the outlet port axis 918 are in close proximity to the handlebar 104 (e.g., abuts and/or within a handlebar proximity zone), such that a hydraulic line 922 may be routed close to the handlebar 104. FIG. 17 shows an example of a handlebar proximity zone 923 within which at least part of the hydraulic output 910 and/or at least part of the reservoir 912 may be disposed when the bicycle hydraulic brake control device 901 is attached to the handlebar 104.

Figure 18:
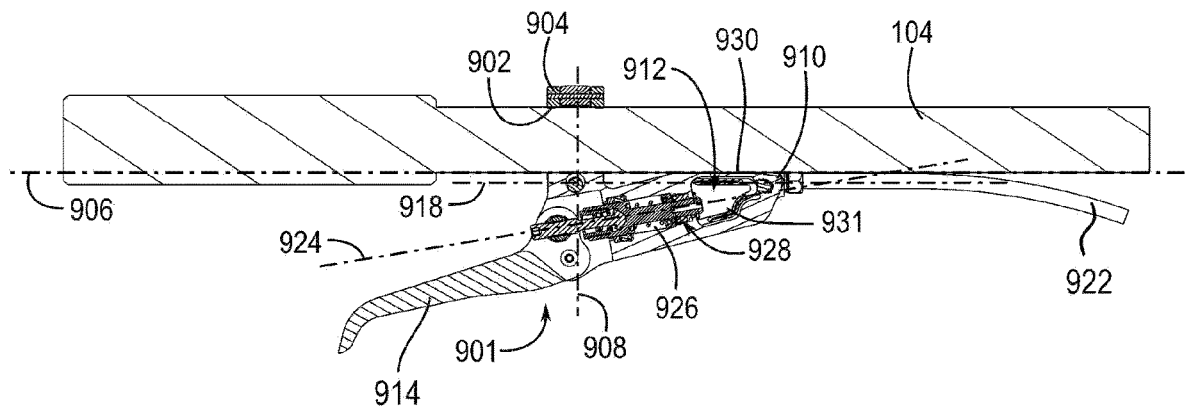
FIG. 18 is a first cross-section of the seventh embodiment of the hydraulic braking control device of FIG. 15, separate from the handlebar.

Referring to FIG. 18, a cylinder axis 924 may be angled towards the handlebar 104, so that the hydraulic output 910 may be in close proximity to or abut the handlebar 104. In the embodiment of FIGS. 15-19, the reservoir 912 is positioned between and in-line with a bore 926, within which a piston assembly 928 is movable, and the hydraulic output 910. Other configurations may be provided.

The close proximity of the hydraulic output 910 to the handlebar 104 may be provided due to a size, shape, and/or orientation of the reservoir 912. For example, the reservoir 912 may be adjacent to the handlebar 104 in that a reservoir cover 930, covering, for example, a diaphragm or a seal 931 covering the reservoir 912, may abut the handlebar 104 when the bicycle hydraulic brake control device 901 is attached to the handlebar 104. Further, a length of the reservoir 912 may extend in a direction parallel to the clamp surface axis 906, and the reservoir 912 may be disposed between and in line with the bore 926 and the hydraulic output 910.

Figure 19:
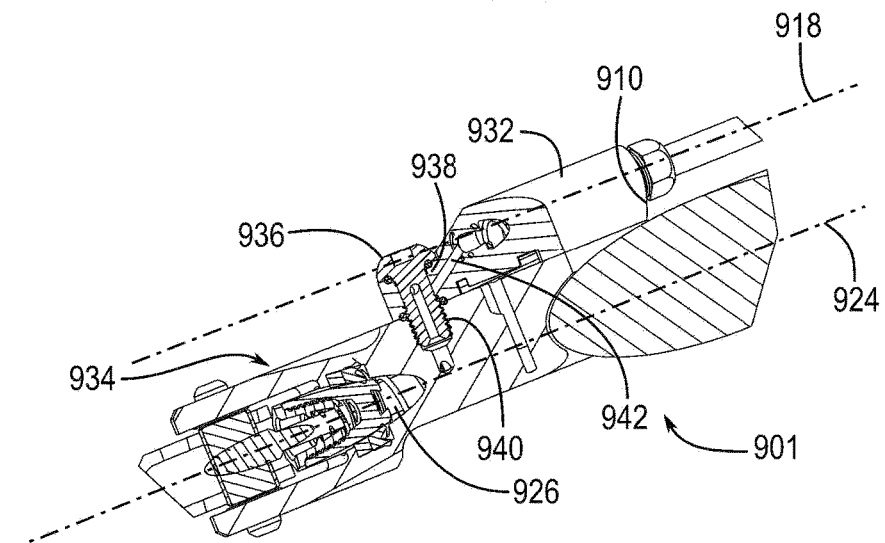
FIG. 19 is a second cross-section of the seventh embodiment of the hydraulic braking control device of FIG. 15, separate from the handlebar.

Referring to FIGS. 17 and 19, as discussed above with reference to the embodiment of FIG. 14, the outlet port axis 918 may be offset relative to the cylinder axis 924. Referring to FIG. 19, a support 932 is attached to a housing 934 of the bicycle hydraulic brake control device 901 with a connector 936 and corresponding threaded openings 938, 940 in the support 932 and the housing 934 of the bicycle hydraulic brake control device 901, respectively. The support 932 includes a passage 942 via which the hydraulic output 910 is fluidly connected to the bore 926. The attachment of the support 932 to the housing 934 of the bicycle hydraulic brake control device 901 provides that the outlet port axis 918 is offset relative to the cylinder axis 924.

Although certain control devices, bicycles, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

Another embodiment of a bicycle hydraulic brake control device 1001 is shown in FIGS. 20-23 and generally includes a housing 1002 and the lever assembly 205 including a lever 206 pivotably attached to the housing 1002. The control device 201 may also include the reservoir cover 208 that covers a reservoir. Also visible are a piston adjustment knob 210 and the lever adjustment mechanism 214, as are described herein. The housing 202 includes a master cylinder that is hydraulically connected to a slave cylinder. The slave cylinder operates a brake force application device, such as a hydraulic caliper (not shown), by a hydraulic line attached to the hydraulic output 212. A clamp device 204 or any suitable fastener may be part of or attached to the housing 1002 for attaching the housing 1002 to a handlebar 104 of a bicycle. This embodiment is similar to the embodiment shown in FIGS. 2-9 except that in this embodiment the cylinder axis 1086 is parallel to the clamp surface axis 324. In this embodiment, the outlet port axis 1030 bisects both the cylinder axis 1086 and the clamp surface axis 324 at a same acute angle (e.g., acute angles d and e in FIG. 21). In an alternate embodiment, the outlet port axis 1030 bisects both the cylinder axis 1086 and the clamp surface axis 324 at angles (e.g., acute angles d and e in FIG. 21) within 5 degrees of each other.

Figure 20:
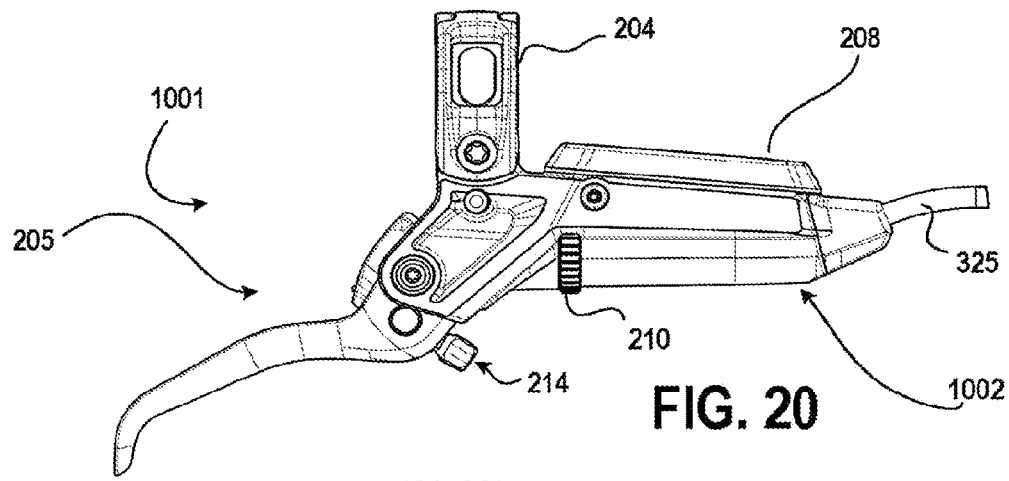
FIG. 20 is a side view of a hydraulic braking control device according to another embodiment.
Figure 21:
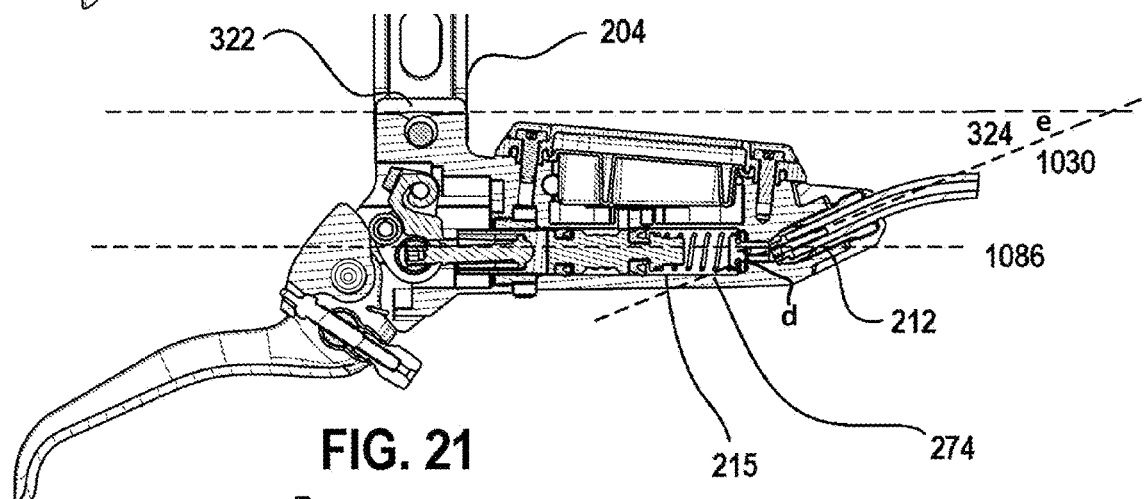
FIG. 21 is a cross-section view the hydraulic braking control device, taken along axis A-A as shown in FIG. 6.
Figure 22:
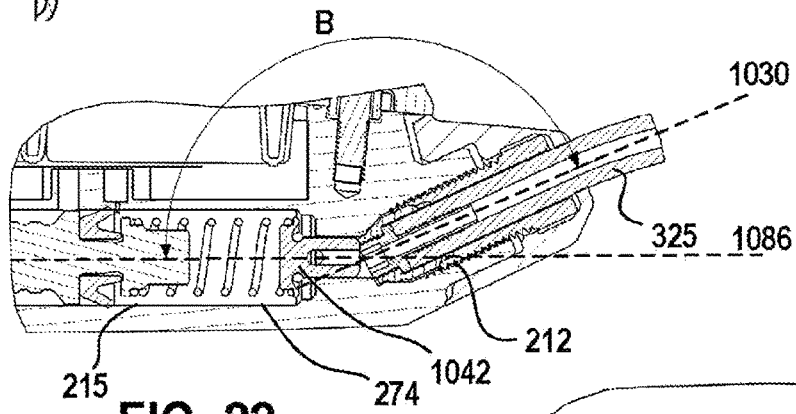
FIG. 22 is an enlarged sectional view of a portion of FIG. 21.
Figure 23:
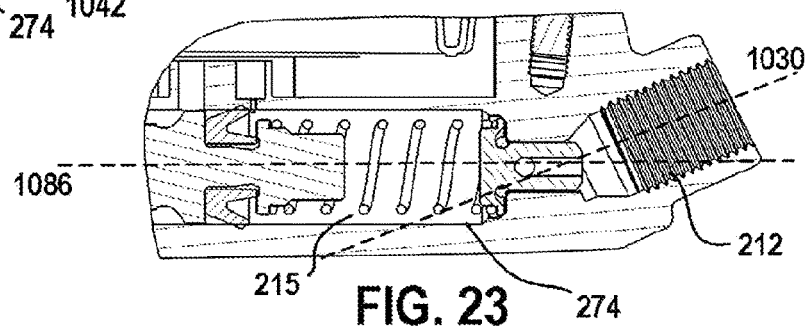
FIG. 23 is an enlarged sectional view of the hydraulic cylinder portion of the hydraulic braking control device of FIG. 21.

FIG. 21 shows a bisected sectional view of the bicycle hydraulic brake control device 1001 shown in FIG. 20. FIGS. 22 and 23 indicate an enlarged sectional view of the outlet port 212 and hydraulic cylinder portions of FIG. 21. In this embodiment, the outlet port 212 axis 1030 is different than the cylinder axis 1086. In other words, the cylinder axis 286 is not in line with the outlet port axis 1030. For example, as shown in the current embodiment, and the outlet port axis 1030 is at a first positive acute angle relative to the cylinder axis 1086 and the same positive acute angle relative to the clamp surface axis 324, such that the hydraulic output 212 faces towards the handlebar 104 when installed on the handlebar 104.

In this embodiment, the inner annular surface 322 of the clamp device 204 of the bicycle hydraulic brake control device1001 defines the clamp surface axis 324. The clamp surface axis 324 is perpendicular to the cylinder axis 1086.

FIG. 22 shows a hose 325 installed in the hydraulic output 212. Similar to the embodiment shown in FIGS. 2-9, the hose 324 interacts with a flow control valve 1042 at the intersection of the outlet port 212 axis 1030 and the cylinder axis 1086 forming an obtuse approach angle B between the hose 324 and the flow control valve 1042. Upon installation, the hose 324 interacts with the flow control valve to move the flow control valve against a biasing device to open flow between the master cylinder and the outlet port. As is shown in FIG. 23, when no hose is installed, the flow control valve 1042 is positioned to fluidly seal the master cylinder from the outlet port.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A brake control device for a bicycle, the brake control device comprising:
   a housing including a support that is configured to be attached to a handlebar of the bicycle via an inner annular surface of the support, the inner annular surface defining a clamp surface axis, the clamp surface axis extending longitudinally along the inner annular surface;
   a reservoir for hydraulic fluid, the reservoir being within the housing;
   a cylinder having an interior defined by a cylinder wall, the cylinder extending along a cylinder axis, the interior of the cylinder being in communication with the reservoir;
   a piston positioned within the interior of the cylinder, the piston being configured to move within the cylinder and along the cylinder axis;
   an actuator pivotably attached to the housing, the actuator being operatively connected to the piston within the interior of the cylinder; and
   an outlet port in communication with the interior of the cylinder, the outlet port being configured to attach to a hydraulic brake line of the bicycle, wherein the outlet port has an outlet port axis, the outlet port axis being a central axis extending through the outlet port, wherein the outlet port axis bisects both the cylinder axis and the clamp surface axis at a same acute angle.

2. The brake control device of claim 1, wherein the outlet port axis is different than the cylinder axis in that the outlet port axis is at a positive acute angle relative to the cylinder axis.

3. The brake control device of claim 1, wherein the outlet port axis is at a positive acute angle relative to the clamp surface axis.

4. The brake control device of claim 1, wherein the outlet port axis is parallel to the clamp surface axis.

5. The brake control device of claim 1, further comprising a pivot, the actuator being pivotably attached to the housing via the pivot, wherein the reservoir and the pivot are on opposite sides of a clamp plane.

6. A control device mountable to a handlebar of a bicycle, the control device comprising:

a housing including a support that is configured to be attached to the handlebar via an inner annular surface of the support, the inner annular surface defining a clamp surface axis, the clamp surface axis extending longitudinally along the inner annular surface of the support;

a reservoir for hydraulic fluid, the reservoir being within the housing;

a cylinder having an interior defined by a cylinder wall, the cylinder extending along a cylinder axis, the interior of the cylinder being in communication with the reservoir;

a piston positioned within the interior of the cylinder, the piston being configured to move relative to the cylinder and along the cylinder axis; and an outlet port in communication with the interior of the cylinder, the outlet port being configured to connect to a hydraulic brake line of the bicycle, wherein the outlet port has an outlet port axis, the outlet port axis being a central axis extending through the outlet port, wherein the outlet port axis is at a first acute positive angle relative to the cylinder axis, the cylinder axis is at a second acute positive angle relative to the clamp surface axis, and the outlet port axis is at a third positive acute angle relative to the clamp surface axis, and wherein the first positive acute angle, the second positive acute angle, and the third positive acute angle are same angles.

7. The control device of claim 6, wherein the outlet port axis, the cylinder axis, and the clamp surface axis are coplanar.

8. The control device of claim 6, further comprising:

an actuator that is operatively connected to the piston within the interior of the cylinder; and a pivot, the actuator being pivotably attached to the support or the housing via the pivot and being pivotable relative to the support via the pivot about a pivot axis.

9. A brake control device for a bicycle, the brake control device comprising:

a housing including a support that is configured to be attached to a handlebar of the bicycle via an inner annular surface of the support, the inner annular surface defining a clamp surface axis, the clamp surface axis extending longitudinally along the inner annular surface;

a reservoir for hydraulic fluid, the reservoir being within the housing;

a cylinder having an interior defined by a cylinder wall, the cylinder extending along a cylinder axis, the interior of the cylinder being in communication with the reservoir;

a piston positioned within the interior of the cylinder, the piston being configured to move within the cylinder and along the cylinder axis;

an actuator pivotably attached to the housing, the actuator being operatively connected to the piston within the interior of the cylinder; and an outlet port in communication with the interior of the cylinder, the outlet port being configured to connect to a hydraulic brake line of the bicycle, wherein the outlet port has an outlet port axis, the outlet port axis being a central axis extending through the outlet port, wherein the outlet port axis bisects both the cylinder axis and the clamp surface axis at acute angles within five (5) degrees of each other.

* * * * *